Nov. 22, 1949  C. R. PARMENTER  2,488,556
APPARATUS FOR CHECKING CIRCUIT CONTINUITY
AND IDENTIFYING WIRES
Filed Jan. 8, 1946  3 Sheets-Sheet 1

INVENTOR
CHARLES R. PARMENTER
BY M. O. Hayes
ATTORNEY

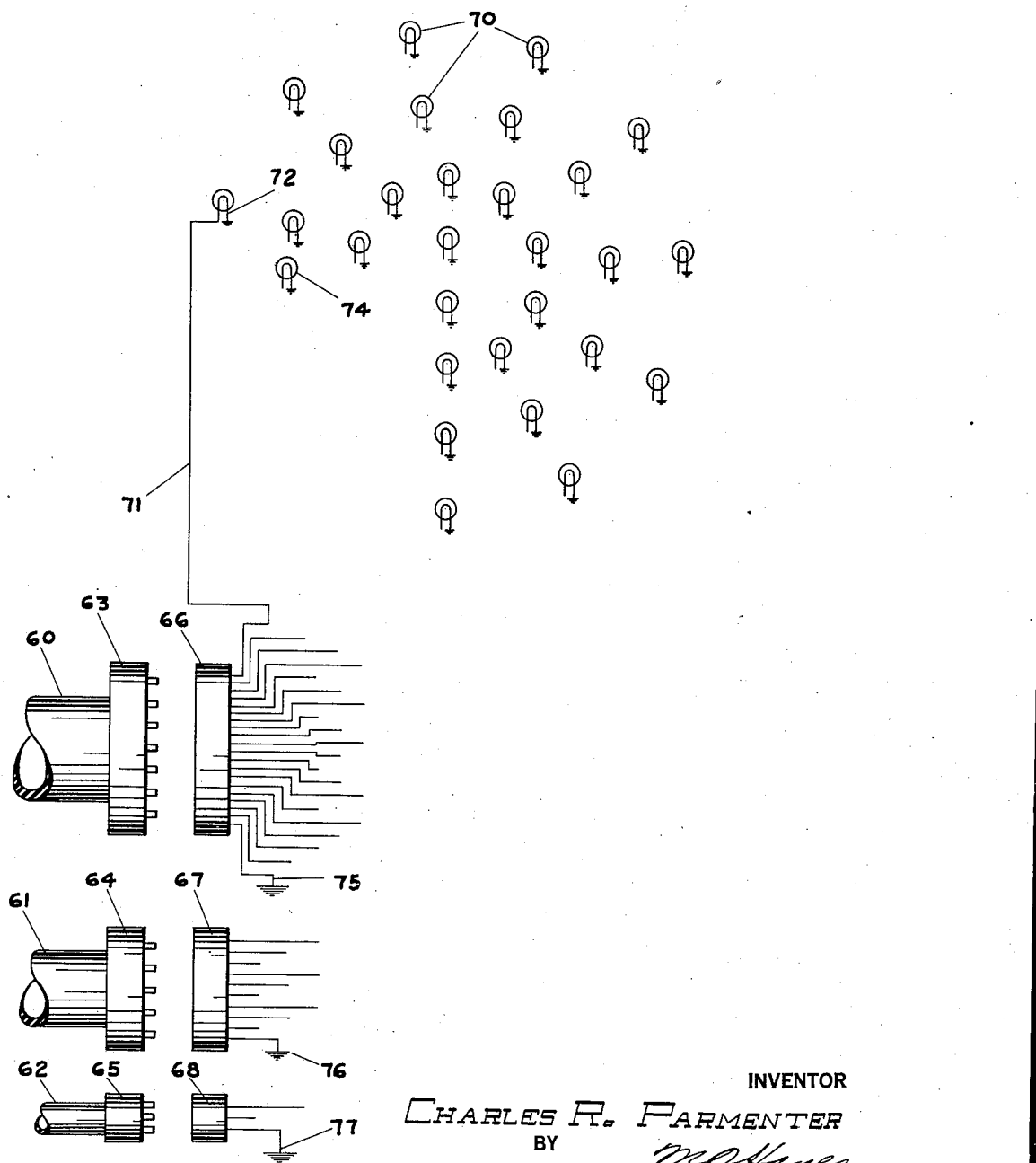

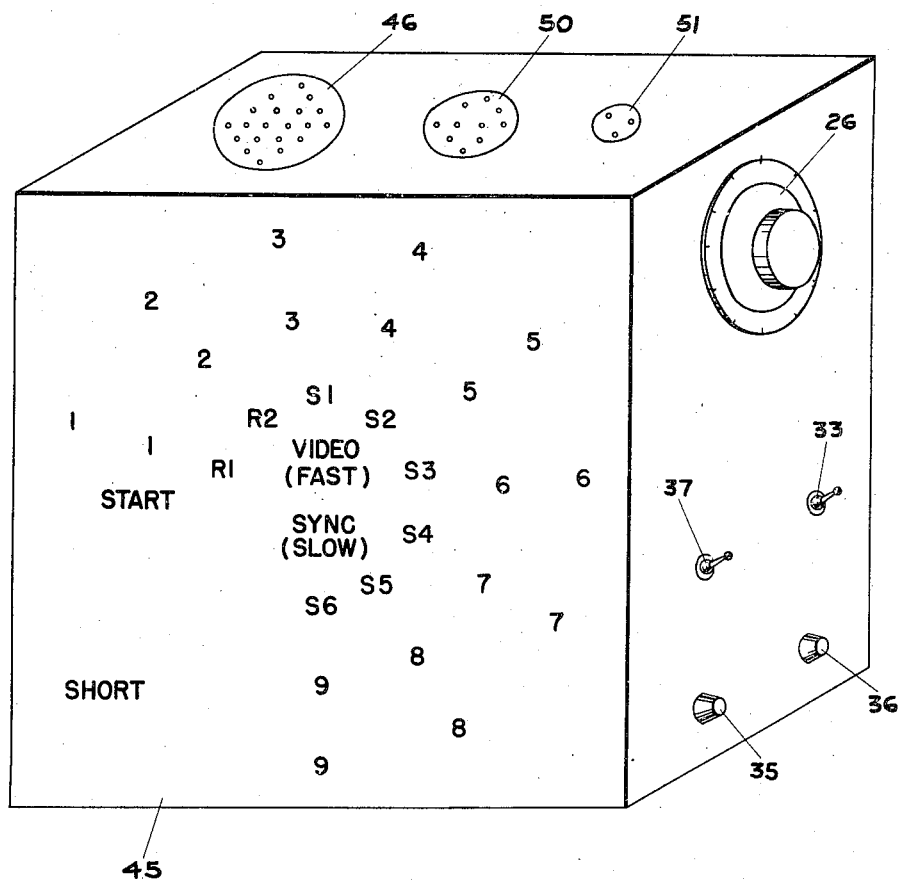

Patented Nov. 22, 1949

2,488,556

UNITED STATES PATENT OFFICE 2,488,556

APPARATUS FOR CHECKING CIRCUIT CONTINUITY AND IDENTIFYING WIRES

Charles R. Parmenter, Redwood City, Calif.

Application January 8, 1946, Serial No. 639,881

2 Claims. (Cl. 175—183)

(Granted under the act of March 3, 1883, as amended April 30, 1928; 370 O. G. 757)

This invention relates to circuit testers, and more particularly to apparatus for checking circuit continuity and identifying terminals in a multiple wire cable.

A particular embodiment of the apparatus is here illustrated and described; and a suggested manner of using it to test a cable on a ship, particularly a cable feeding a remote radar indicator, is here outlined.

Aboard ships, particularly naval vessels, it is customary to install several different radio detection devices, known as radars. Each radar transmits and receives radiant energy through its own directional antenna, which is rotatable in azimuth in such a manner as to train the radar beam in any desired direction. Presentation of information detected by the radar is generally done through one of several forms of cathode ray oscilloscopes, one form of which is known as a Plan position indicator, or PPI. This indicator presents a radial cathode ray beam which rotates in synchronism with the radar antenna and traces the received video (visible) signals on the scope, to outline a map of the surrounding radar echoes.

In addition, a considerable number of remote indicators, or remote PPI's, are positioned about the vessel in strategic locations. All the electrical information required to operate the main PPI in the radar must be transmitted to each of remote PPI's, in order to actuate them properly. For this purpose it is generally customary to use a multiple wire cable, each wire of which carries one of the distinctive electrical signals needed to properly actuate the remote PPI. The principal electrical channels which must be provided for each remote PPI are the video channel, which carries the radar echo signal; the synchronizing, or sync, channel, which controls the starting moment of each sweep of the radial PPI beam; and the several channels carrying the signals required to actuate the follow-up, or remote positioning, devices needed to produce correspondence between the radial PPI beam and the azimuthal direction of the radar antenna.

A common form of remote positioning device used aboard naval vessels is the synchor, having a rotor and a stator, the former requiring two leads for power, the latter, three. Remote PPI's often use two independent synchros; although the two rotors may be connected together, the two stators must have independent three-wire channels. Thus, a total of eight wires is required to control the two synchros found commonly in remote PPI's.

It is thus seen that eight synchro leads, a sync lead, a video lead, and a ground lead, to serve as return conductor for all the rest, are required; a total of eleven wires within the multiple wire cable. Although each wire within the cable is distinctively coded during fabrication, as by color or otherwise, it often occurs that dirt, natural fading, or similar deterioration is suffered by the wires of the cable. Thus, by the time the cable has been installed on the vessel, the coding of the wires has become indistinct and ambiguous.

To check circuit continuity and identify terminals in each multiple wire cable, it has heretofore been customary to use a telephone talking circuit. This was necessary because the remote PPI was usually located some distance from the radar itself. This method, however, has certain inherent shortcomings, such as error due to induced cross-talk, and failure to detect grounded and shorted wires within the cable.

It is, therefore, an object of this invention to provide apparatus for checking circuit continuity and identifying terminals in a multiple wire cable which overcomes the objections and shortcomings in apparatus and methods heretofore used.

It is another object of this invention to provide such apparatus which checks not only circuit continuity but which is also effective to detect grounded wires within the cable, or wires which are short-circuited, one to the other.

It is still another object of the invention to provide testing apparatus for the purpose described above which may be properly and effectively utilized by inexpert and relatively untrained personnel.

It is a further object of this invention to provide apparatus for indicating the manner in which wires within a multiple-wire cable should be connected to a terminal board, as well as indicating the manner in which the wires are actually connected to the terminal board.

It is a still further object of the instant invention to provide for successively energizing a plurality of contact points corresponding to the number of wires in the cable to be checked in such a manner that an operator may know whether or not the terminals to which the contacts correspond at the other end of the cable are properly identified.

In accomplishing these and other objects of the present invention, I have provided improved details of structure, the preferred form of which is illustrated in the accompanying drawings, wherein:

Fig. 2 is a schematic wiring diagram of the receiving unit of the tester, which is adapted to be connected to the other end of the cable. The connector on the other end of the cable is shown in position to receive the corresponding connector on the receiving unit.

Fig. 3 is a view illustrating the external appearance of the transmitting unit of the tester.

Figure 1:
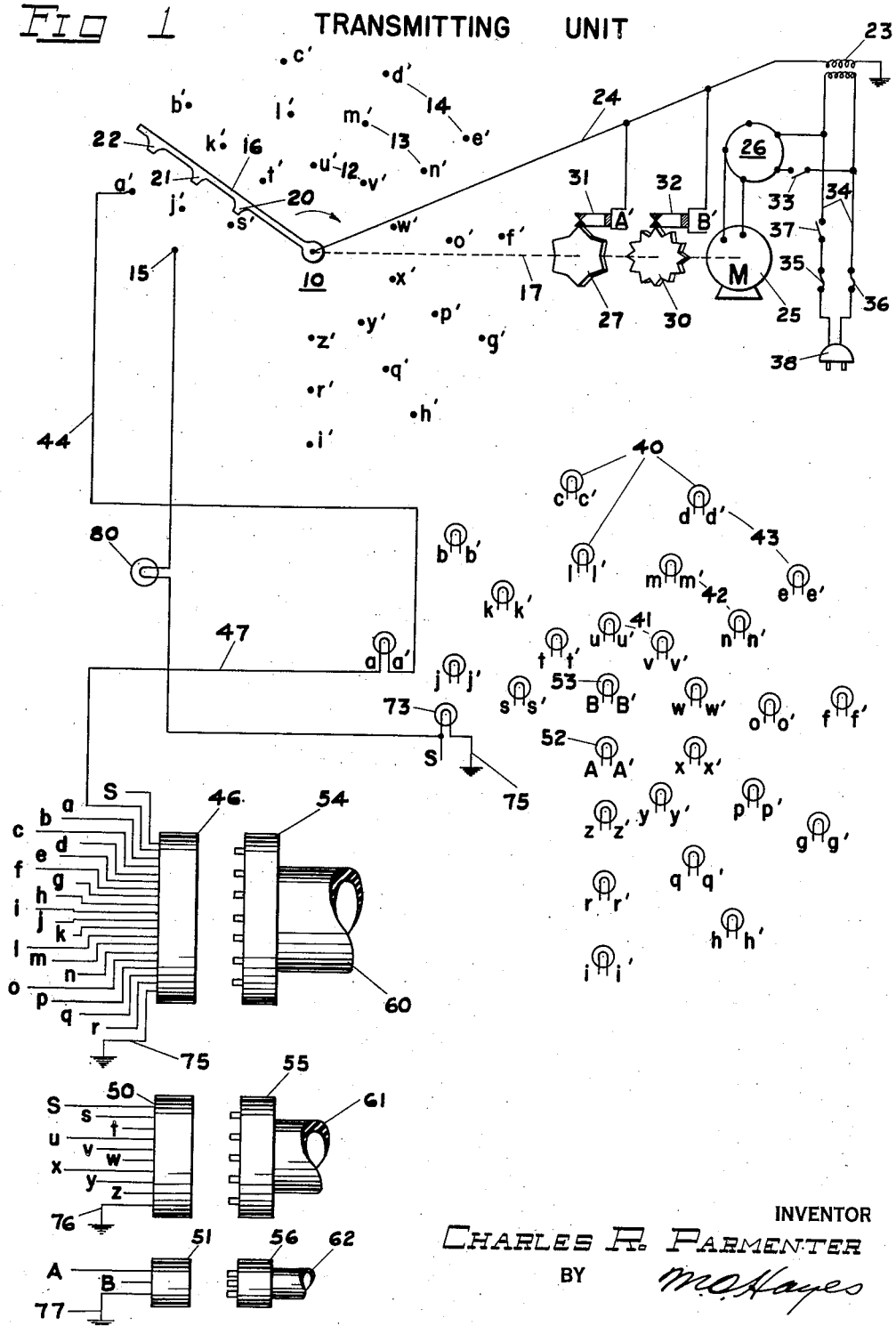
Fig. 1 is a schematic wiring diagram of the transmitting unit of the tester, which is adapted to be connected to one end of a multiple wire cable to be checked. For illustrative purposes, the connector on the end of the cable is shown in position to receive the corresponding connector on the transmitting unit.

The tester of this invention comprises two units—a transmitting unit and a receiving unit. The transmitting unit contains a rotary, motor-driven switch having a plurality of contact points to which electrical contact is made in succession by an energized rotating arm. Each contact is connected in series with an indicating means, for example a light, also located in the transmitting unit; and with a similar indicating means located in the receiving unit. Between the two indicating means, and completing the series connection, is the multiple wire cable undergoing test. As the arm rotates, a flashing light in the transmitting unit reveals which terminal on the transmitting end of the cable is being energized, and the simultaneous flashing of a light in the receiving unit reveals which terminal on the receiving end of the cable is receiving the voltage. In this manner, terminal identity may be established for the cable. Inasmuch as the transmitting end of the cable is always energized in a known sequence, the indicting means in the transmitting unit may be omitted if desired. In this case, the operator must remember more closely the sequence in which the lights flash in the receiving unit, in order to correct for faultily identified terminals.

In order to ascertain when a sweep of the arm is starting, a gap is provided in the even spacing of the contact points in the transmitting unit, and a "start" light is provided at the forefront of the sweep to show that a sweep is beginning.

Referring more in detail to the drawings:

In Fig. 1, the transmitting unit is shown consisting of a rotary switch 10 having three circular rows of contact points 12, 13, and 14. As shown, inner row 12 contains eight contact points designated $s'$ thru $z'$ inclusive; intermediate row 13 contains nine contact points designated $j'$ thru $r'$ inclusive and a tenth contact 15 at the beginning of the row; and outer row 14 contains nine contact points $a'$ thru $i'$, positioned opposite the corresponding intermediate row contacts $j'$ thru $i'$, respectively. It will be noted that a gap in the even spacing of the contacts has been provided between the last contacts $i'$, $r'$, $z'$, in the rows and the "start" contact 15. This is to provide positive identification of the "start" wire at the receiving unit of the tester, to be described below. A conductive arm 16, rotated by a shaft designated schematically by dotted line 17, makes contact in succession with each of the several contact points thru brushes 20, 21 and 22. Voltage from a transformer 23 is applied thru a conductor 24 and thru conventional slip rings, not shown, to the conductive arm 16. Thus, voltage is momentarily applied to each contact point once during each revolution of shaft 17.

Shaft 17 is rotated at selectively variable speed by a motor 25, which is powered by an adjustable auto transformer 26. Also driven by shaft 17 are non-conductive star wheels 27 and 30, the former preferably containing six teeth, the latter, preferably twelve. Star wheel 27, when rotated, repeatedly opens and closes a microswitch 31; while star wheel 30 actuates a switch 32 in a similar manner, but with this arrangement at twice the repetition rate by virtue of the greater number of teeth in wheel 30. The primary winding of the adjustable auto transformer 26 is connected, thru a manually operable switch 33, to power carrying conductors 34, which also supply power for the primary winding of transformer 23. Line 34 is connected thru fuses 35 and 36 and thru a manually operable switch 37 to a conventional plug 38 adapted to be connected to a source of A. C. power.

Also within the transmitting unit of the tester is a bank of indicating means, preferably in the form of small lights 40. In the preferred embodiment of this invention, lights 40 are arranged in a single plane in three circular rows 41, 42, and 43 corresponding closely to the three rows of contact points 12, 13 and 14, respectively, as may be seen from the drawing, Fig. 1. Each contact point, $a'$ thru $z'$ is connected electrically to the correspondingly located light 40. One of these connections 44 has been shown joining contact $a'$ on contact switch 10 with point $a'$ on one of the lights 40. It is to be understood that there are, in this instance, twenty-six such electrical connections similar to 44, each connecting a contact point with one side of a corresponding light 40. That is, $b'$ on switch 10 is connected to $b'$ on the bank of lights; $c'$ is connected to $c'$, and so on thru $z'$ to $z'$. Directly over the bank of lights 40 is positioned an opaque cover member 45 (Fig. 3), having identifying symbols cut therein, one over each of the lights 40.

Each of the lights 40 in the two outer rows 42 and 43 has its other terminal, i. e., the terminal not connected to one of the contact points, connected to a corresponding terminal on a female connector 46 (Figs. 1 and 3). These connections are represented by an electrical connection 47, tying point $a$ on the bank of lights 40 to point $a$ on connector 46. It is to be understood that each of the other points $b$ thru $r$ is similarly connected. Separate female connectors 50 and 51 are used for the connections $s$ thru $z$, and A and B, respectively.

Micro-switches 31 and 32 have their points $A'$ and $B'$ connected to the similarly designated points on lights 52 and 53, respectively; and thence the circuit goes thru points A and B to the correspondingly marked terminals on connector 51.

The circuits and components thus far described are located within the transmitting unit of the tester, appearing externally as illustrated in Fig. 3. Each of the connectors 46, 50, and 51 is adapted to receive a male connector, shown at 54, 55, and 56, respectively, attached to the end of cables 60, 61, and 62, respectively. It is to be understood that the cables and connectors 60—54, 61—55, and 62—56 are not part of the apparatus constituting this invention, but are rather the multiple wire cables undergoing test by the apparatus of this invention. It will be further understood that although three cables may be simultaneously tested, as shown at 60, 61 and 62, for many applications only one or two cables are to be tested at a time; and the operation of this apparatus will be more simply described by reference to only one or two of the cables.

Referring now to Fig. 2, there is shown the receiving unit of the tester adapted to receive the other end of the cable under test. There have been illustrated the other end of cable 60, to which is attached connector 63; the other end of cable 61, to which is attached connector 64; and the other end of cable 62, to which is attached connector 65. Within the receiving unit are three connectors 66, 67, and 68, identical to connectors 46, 50, and 51, respectively, of the transmitting unit. The receiving unit also contains a bank of lights 70 positioned like the bank of lights 40 in the transmitting unit, and having one side of each light connected to a corresponding terminal on one of the connectors 66, 67 or 68, exactly in the manner that lights 40 are connected to connectors 46, 50, or 51 in the transmitting unit. Electrical connection 71 is representative of these connections. The other side of each of the lights 70 is grounded as shown at 72.

In this regard, it is to be understood that the ground symbols as used in Figs. 1 and 2 represent the same function as is symbolized by the several letters $a$ thru $z$, etc. An actual electrical connection is required to complete the circuit represented by the ground symbol; and for this reason ground wires 75, 76, and 77 must be included as one of the wires in each of the cables 60, 61, and 62, to serve as return lead to the source of voltage, transformer 23.

Reviewing the above description, it will be seen that when contact is made to one of the contact points, for example contact $a'$ on switch 10, a circuit is completed from transformer 23, to arm 16, to contact point $a'$ thru light $a$—$a'$ of the group of lights 40, to terminal $a$ on the transmitting unit connector 46, and thence to the opposing wire within the cable 60 under test. From there, the circuit follows thru the cable 60, to the terminal of the receiving unit connector 66, to one of the lights 70 in the receiving unit and thence it returns to transformer 23 thru the ground return wire 75. This circuit analysis applies to each of the contact points $a'$ thru $z'$, and each micro-switch line $A'$ and $B'$. It will be seen that the two lights being energized, 40 and 70, are connected in series, so that both the transmitting unit and the receiving unit must be in use in order to permit operation of any of the transmitting unit lights 40.

In order to know when conductive arm 16 is starting on a sweep, it is desirable to have a "start" light 73 within the transmitting unit, connected to contact point 15, which is the first one touched by arm 16 as it starts a sweep.

For certain purposes it is advantageous to use the transmitting unit without the receiving unit; and for such use it is necessary that "start" light 73 in the transmitting unit be in parallel, and not in series, with "start" light 74 of the receiving unit. This is evident in the wiring illustrated, wherein "start" light 73 is returned directly to ground at 75, instead of being returned to ground thru the other "start" light 74.

*Operation*

An exemplary operation of the circuit tester, in connection with the checking of a cable feed- ing signals to a remote PPI referred to hereinbefore, is as follows:

The remote PPI is first connected to the radar thru the cables 61 and 62. Cable 61 carries synchro information to the PPI and contains two wires for the rotors R1 and R2, Fig. 3, and six wires for the stators, R1 thru R6, inclusive, as alluded to above. In addition, video and sync signals are transmitted thru cable 62. Each cable has a ground wire; the "start" connection, needed for use with cable 61, is provided by a tenth wire normally used to send power to a small panel light on the remote PPI.

Connectors 55 and 56 are then removed from the radar and plugged into connectors 50 and 51, respectively, on the transmitting unit of the tester. Power is applied to the transmitting unit including motor 25. Arm 16 rotates, contacting each of the contact points in succession. Normally, only "start" light 73 flashes momentarily with each revolution of arm 16. However, should one of the cable wires be grounded, light 40 corresponding to the grounded wire also flashes as contact arm 16 passes the corresponding contact point. The operator may then examine that wire to detect the short.

When the cable has been proved to be free of shorts to ground, an operator at the receiving end of the cable plugs male connectors 64 and 65 into female connectors 67 and 68, respectively, on the receiving unit of the tester. If the wires have been connected properly, the indicating symbols on the panel of the receiving unit (identical in appearance to panel 45 of the transmitter unit, Fig. 3) light up in proper sequence. That is, "start" ashes follow promptly and in succession by R1, R2, S1, S2, S3, S4, S5, and S6. A period of quiescence, resulting from the abnormal spacing, in the rotary switch 10, between contact point $z'$ and contact point 15, then follows. This positively identifies the "start" light as being correctly connected. The sequence is then repeated.

If the wires are improperly connected, the symbols on the receiving unit panel light up in improper sequence. In this event, the operator has merely to note where each lead should go, and after correction at the terminal board on the receiving end of the cable, the lights appear in proper sequence.

In the meantime, cable 62 continually carries signals for the video and sync lights. The former flashes rapidly, by virtue of the operation of star wheel 30; while the latter flashes more slowly, by virtue of the operation of star wheel 27. The distinctive nature of these flashes positively identifies these terminals without the action of the "start" signal associated with rotary switch 10, of which they are independent.

In the meantime, the symbols on the transmitting unit continue to light in the proper sequence, because the connections on this end are fixed correctly in order to show the proper identification. While it is thus seen that the lights on the transmitting unit are not essential to the operation of the tester, they do serve a useful function when it is desired to stop arm 16 on a particular contact point to make a slower, more detailed investigation of the connections. Furthermore, as mentioned above, the transmitting unit lights 40 are required in the detection of shorts to ground before connection of the receiving unit to the cable under test.

The fault of a short circuit between two of the wires in the cable is distinctively indicated by the simultaneous lighting, in the receiving unit only, of both of the lights concerned. When this occurs, the operator need investigate only those wires corresponding to the symbols which lighted simultaneously during test.

In review it will be noted that the transmitting unit, in effect, presents a picture of how the terminals on the receiving end of the cable should be connected; while the receiving unit presents a picture of how they actually are connected. From this information the operator or operators may quickly correct any mis-matching of terminals and positively identify the wires within the cable.

It will be noted that the "start" wire S, within the cable, is connected directly to the source of voltage, without any intervening indicating light 40. This results from the parallel connection of the two "start" lights in contrast to the series connection between the remainder of the lights 40 and 70. In practice, it was found that accidental grounding of the "start" wire caused repeated fuse burn-outs. To obviate this, a low resistance light 80 is incorporated in series with contact point 15. In normal use, light 80 flashes dimly with each flash of the "start" lights 73 and 74. Should the "start" wire be grounded, however, light 80 flashes much more brightly, indicating to the operator that an accidental ground has occurred on the "start" wire.

Connectors 46—66 of the tester are particularly suited for the testing of a paired-wire cable, for example, a cable containing pairs of telephone wires. The arrangement of lights 40 is such that the two wires of the several pairs may be expeditiously checked simultaneously. Reference to Fig. 3 shows that the numbers in the two outer circles are paired along radial lines. Hence, it will be readily seen that in operation, when the terminals are connected correctly, the two symbols "1" flash simultaneously, followed in succession by the two "2's," then the "3's," etc. In this manner the operation of checking a paired-wire cable is halved in time.

If desired, the indicators 40—70, instead of being in the form of lights, may be in the form of sounders, such as buzzers. Each indicator may then be given a distinctive sound, or tonal pitch, so that the units may be used without requiring constant visual attention of the operator.

From the above description, it will be seen that there has been disclosed apparatus for testing circuit continuity and identifying terminals in a multiple wire cable, which gives positive identification of each wire, and avoids many of the shortcomings of present methods and apparatus. This device is extremely simple to use and may be placed in the hands of relatively untrained and poorly educated operators, with assurance that satisfactory and correct results may be obtained from its use.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. Apparatus for testing and identifying wires in a multiwire cable, the ends of which are remotely spaced from the other, comprising a transmitter and a receiver; said transmitter including a movable conductive arm; a star wheel; a shaft for supporting said arm and said star wheel; motor means for driving said shaft; a source of voltage; a first indicating means, a switch actuated by said star wheel, means connecting said indicating means and said switch in series with said source of voltage; a plurality of contact points engageable by said arm; conductors leading from each of said points respectively, to each of a plurality of indicating means; conductors leading from each of said indicating means, respectively, to each individual terminal of a multiple electrical connector adapted to receive one end of the multiwire cable to be checked by engagement with each wire thereof; and said receiver including a multiple electrical connector for engagement with the other ends of each of said wires; conductors leading from each terminal of said second connector to a respective one of a plurality of indicating means; conductors leading from each of said second indicating means to a common terminal communicating with said source of voltage; engagement of the respective ends of said cable wires with said electrical connectors completing a circuit whereby each of the second plurality of indicating means is in series with a respective one of the second plurality of indicating means and with a respective one of said contact points.

2. Apparatus for testing and identifying wires in a multi-wire cable, the ends of which are remotely spaced from each other, comprising a transmitter and a receiver, said transmitter comprising a rotary switch including a rotary arm and a plurality of circumferentially arranged contacts, a like plurality of indicating means, a first multiple electrical connector having a like plurality of terminals, means connecting in series corresponding contacts, indicating means and terminals, a source of electrical energy connected between said rotary arm and a point at ground potential, motor means for rotating said rotary arm whereby an electrical series connection is successively made from said source of energy to each of the aforesaid series connections; a second plurality of indicating means, a second multiple electrical connector having a like plurality of terminals, a like plurality of switches, means connecting corresponding indicating means, switches and terminals in series with said source of electrical energy, a like plurality of star wheels for actuating corresponding switches, and motor means for rotating said star wheels; said receiver comprising a first plurality of indicating means corresponding to the plurality of indicating means that are connected to said rotary switch, a first multiple electrical connector having a like plurality of terminals, means electrically connecting one each of said indicating means between a corresponding terminal of said connector and a point at ground potential; a second plurality of indicating means corresponding to the second plurality of indicating means that are connected to the star-wheel-operated switches in said transmitter, a second multiple electrical connector having a like plurality of terminals, and means electrically connecting one each of said indicating means between a corresponding terminal of said connector and a point at ground potential whereby, when a first multiple cable to be tested is connected between the first multiple connector of said transmitter and the first multiple connector of said receiver, a series circuit is successively made between corresponding indicating means of said transmitter and receiver by rotation of said rotary arm, and when a second cable to be tested is connected between the second connector of said transmitter and the second connector of said receiver a series circuit is successively made between corresponding indicating means of said transmitter and receiver at a rate that is a function of the rate of actuation of the star-wheel-operated switch by the star wheel corresponding to each series circuit.

CHARLES R. PARMENTER.

REFERENCES CITED

The following references are of record in the file of this patent:

UNITED STATES PATENTS

| Number | Name | Date |
| --- | --- | --- |
| 425,125 | Douglass | Apr. 8, 1890 |
| 606,356 | Norden | June 28, 1898 |
| 740,357 | Eastman et al. | Sept. 29, 1903 |
| 1,055,018 | Burnham | Mar. 4, 1913 |
| 1,089,814 | Beach et al. | Mar. 10, 1914 |
| 1,496,875 | Field | June 10, 1924 |
| 1,738,710 | Jones | Dec. 10, 1929 |
| 1,977,703 | Swartwout | Oct. 23, 1934 |